United States Patent [19]

Parsons et al.

[11] Patent Number: 5,195,374
[45] Date of Patent: Mar. 23, 1993

[54] SENSOR SYSTEMS

[75] Inventors: Philip Parsons, Farnham; Jolyon P. Willson, Andover, both of England

[73] Assignee: Schlumberger Industries Limited, Farnborough, United Kingdom

[21] Appl. No.: 805,150

[22] Filed: Dec. 11, 1991

Related U.S. Application Data

[63] Continuation-in-part of Ser. No. 567,024, Aug. 14, 1990, Pat. No. 5,105,665.

[30] Foreign Application Priority Data

Aug. 30, 1989 [GB] United Kingdom ............... 8919573
May 11, 1990 [GB] United Kingdom ............... 9010660

[51] Int. Cl.[5] .................... G01L 7/08; G01L 9/08; G01L 11/00
[52] U.S. Cl. ................... 73/704; 73/704; 73/705; 73/DIG. 1; 250/231.19
[58] Field of Search .......... 73/702, 704, 705, DIG. 1, 73/DIG. 4, 579, 584, 592, 862.59, 517 AV, 23.37, 32 A, 754; 250/227.21, 231.1, 231.19

[56] References Cited

U.S. PATENT DOCUMENTS

| | | | |
|---|---|---|---|
| 4,988,885 | 1/1991 | Lindstrom | 73/170 A |
| 5,105,665 | 4/1992 | Parsons et al. | 73/704 |
| 5,124,653 | 6/1992 | Andresen et al. | 73/23.37 |
| 5,152,173 | 10/1992 | Willson | 73/705 |

Primary Examiner—Donald O. Woodiel
Attorney, Agent, or Firm—Sanford J. Asman

[57] ABSTRACT

In pressure sensor systems based upon a micromachined silicon pressure sensor comprising a resonantly vibratable beam supported on a diaphragm, the beam is excited into resonant vibration by directing an optical excitation signal at the beam resonant frequency, via an optical fibre 26, onto a part of the sensor other than the beam, preferably the diaphragm. To detect the vibrations, the underside of the beam 16 and the adjacent upper surface of the diaphragm 18 are together arranged to define a Fabry-Perot cavity, and a continuous optical detection signal is directed at this cavity, also via the optical fibre 26. The optical detection signal is thus modulated at the vibration frequency of the beam 16 by the cavity, and the modulated signal is reflected back into the optical fibre 26.

9 Claims, 2 Drawing Sheets

SENSOR SYSTEMS

This application is a continuation-in-part of application Ser. No. 07/567024, filed on 14 Aug. 1990, now U.S. Pat. No. 5,105,665 issued on Apr. 21, 1992.

BACKGROUND OF THE INVENTION

This invention relates to sensor systems, and is more particularly but not exclusively concerned with sensor systems based upon sensors in which the parameter to be sensed affects the frequency of a resonantly vibrating element whose resonant vibration is excited and/or sensed optically.

SUMMARY OF THE INVENTION

According to the present invention, there is provided a sensor system for sensing a measurand, the system comprising:

a sensor comprising a resonantly vibratable element formed as part of a unitary semiconductor structure which is arranged such that application of the measurand to the structure affects the resonant frequency of the vibratable element;

means for exciting said element into resonant vibration; and means for detecting the frequency of said vibration;

wherein said element is arranged to define with an adjacent portion of said structure a Fabry-Perot cavity whose width varies with the vibration of said element; and said frequency detecting means comprises means for directing an optical detection signal at said cavity for modulation thereby at the frequency of said vibration.

BRIEF DESCRIPTION OF THE DRAWINGS

The invention will now be described, by way of example only, with reference to the accompanying drawings, of which.

DETAILED DESCRIPTION OF THE PREFERRED EMBODIMENT

Figure 1:
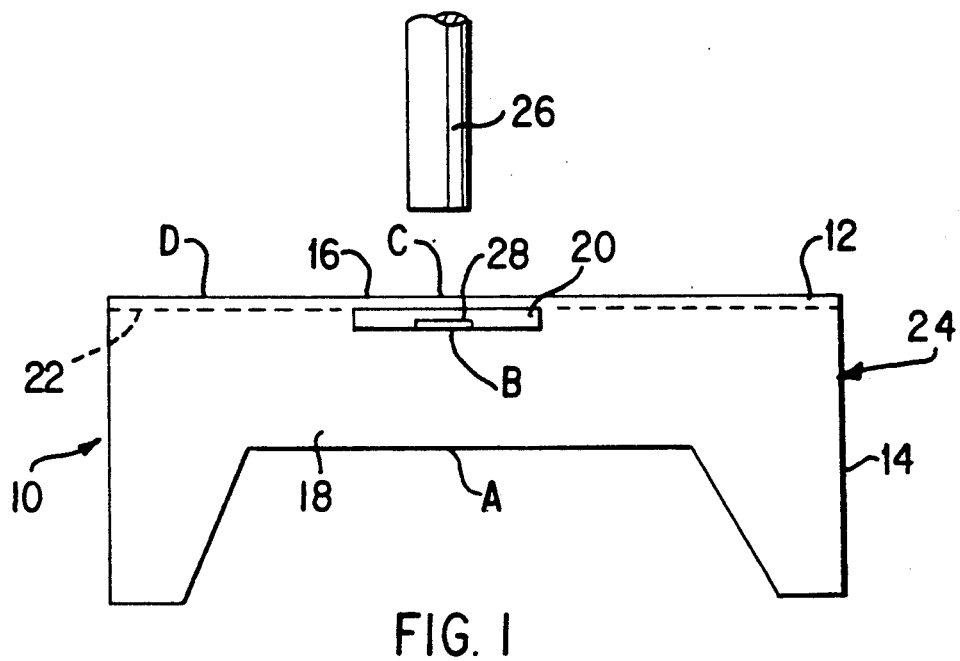
FIG. 1 shows somewhat schematically an optically excitable silicon pressure sensor in accordance with the present invention.

The sensor of FIG. 1 is indicated generally at 10, and is basically similar to the sensor described in detail in U.S. patent application Ser. No. 07/358,771 (Barth et al), filed on 30 May 1989, and entitled LAMINATED SEMICONDUCTOR SENSOR WITH VIBRATING ELEMENT AND ASSOCIATED METHOD AND PRODUCT, the disclosure of which is hereby incorporated by reference. Thus the sensor 10 comprises first and second single crystal silicon wafers 12, 14, of which the first wafer has a beam 16 formed therein by cutting two parallel slots therethrough to define the two longitudinally-extending sides of the beam, while the second has a diaphragm 18 with a trench 20 in its upper surface formed therein by electrochemical etching. The two wafers 12, 14 are fusion bonded together at the dotted line 22, to form a unitary structure 24 in which the beam 16 is disposed above the trench 20 in the diaphragm 18, as described in the aforementioned United States patent application.

To use the sensor 10 as a pressure sensor, the unitary silicon structure 24 is sealed in a suitable housing (not shown), with the upper surface of the diaphragm 18 facing into an evacuated chamber within the housing. The beam 16 is excited into resonant vibration, and a pressure to be sensed is admitted to the housing beneath the diaphragm 18, so that the diaphragm flexes in dependence on the pressure, and thus varies the tension in, and therefore the resonant frequency of, the beam.

In the aforementioned U.S. patent application, the principal methods described for exciting the beam 16 into resonant vibration and sensing the frequency of the resulting vibrations are electrostatic and piezoelectric respectively, although direct optical excitation, by applying pulses of light energy directly to the beam, is also disclosed. In accordance with prior art teachings, e.g., of the aforementioned letter by Venkatesh and Culshaw, this would typically have involved providing the beam 16 with a metal coating, e.g. of gold, at the location indicated at C in FIG. 1, with the disadvantage mentioned earlier. However, we have found that it is possible to excite the beam 16 into resonant vibration indirectly, by directing the optical excitation signal at a region of the unitary structure 24 other than the beam.

Thus we have found that resonant vibration of the beam 16 can be optically excited by directing a suitable pulsed optical excitation signal, via an optical fibre 26 which passes sealingly through the aforementioned evacuated chamber and terminates immediately above the beam, onto an optically absorptive coating 28 of a suitable metal, e.g. aluminium, chromium or gold, deposited, typically by sputtering, on the upper surface of the diaphragm 18 in the base of the trench 20, at the position indicated at B in FIG. 1. It will be noted that the optical excitation signal passes through the beam 16, which can readily be achieved by using a signal whose wavelength is of the order of 1300 nm, to which the unitary silicon structure 24 is substantially transparent.

Since the beam 16 does not require to be coated and therefore consists solely of single crystal silicon, it has a very high Q and its vibration characteristics are very stable and repeatable: in particular, its temperature coefficient is much lower than that of a coated beam, and much more predictable and stable.

When the coating is deposited at B, it forms with the underside of the beam 16 a Fabry-Perot optical cavity, whose width varies with vibration of the beam 16. This cavity can be used as an interferometer to modulate a continuous optical detection signal, applied via the fibre 26 as will become apparent hereinafter with reference to FIG. 3, in order to sense the frequency of vibration of the beam 16.

Even without a coating at B, the space between the underside of the beam 16 and the upper surface of the diaphragm 18 in the base of the trench 20 still acts as a Fabry-Perot cavity, albeit slightly less effectively.

The width of the Fabry-Perot cavity should not normally change sufficiently with movement of the diaphragm 18 in response to changing pressure to cause fading of the modulated detection signal. However, if fading does occur, the problem can be overcome using the two-wavelength detection technique which forms the subject of U.S. patent application Ser. No. 07/629310 (Willson).

As an alternative, the coating 28 can be deposited at the position indicated at D in FIG. 1, adjacent one end of the beam 16 (which would clearly necessitate relocating the optical fibre 26), or at the position indicated at A in FIG. 1, on the underside of the diaphragm 18. Also, instead of an optically absorptive metal coating, a coating of a material exhibiting surface piezoelectric effect, e.g., zinc oxide, can be used.

Figure 2:
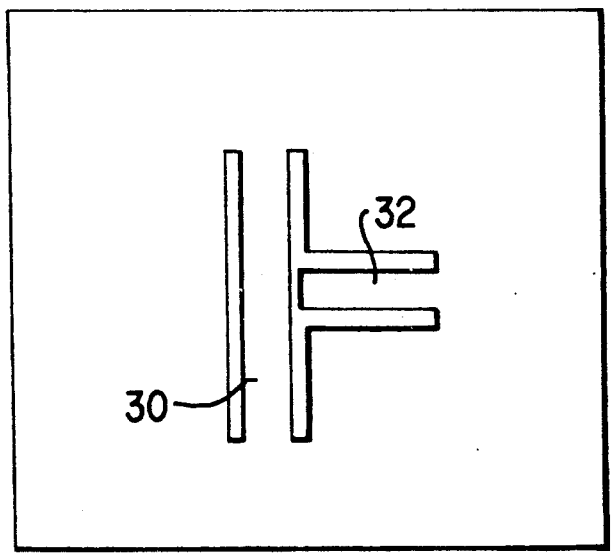
FIG. 2 is a plan view of a modified version of the sensor of FIG. 1.

We have also found that by exciting the diaphragm 18, it is possible to indirectly excite two resonant elements, e.g. beams, simultaneously. FIG. 2 is a plan view of such an arrangement, with a first beam 30 substantially identical to the beam 16 of FIG. 1 (i.e. arranged to be tensioned by an associated diaphragm not shown in FIG. 2), and a second, cantilever beam 32, disposed at right angles to the first beam. The beam 32 is formed in the same cutting operation as is used to form the beam 30, and is used for temperature compensation purposes as described in more detail in our U.S. Pat. No. 4,972,076.

Figure 3:
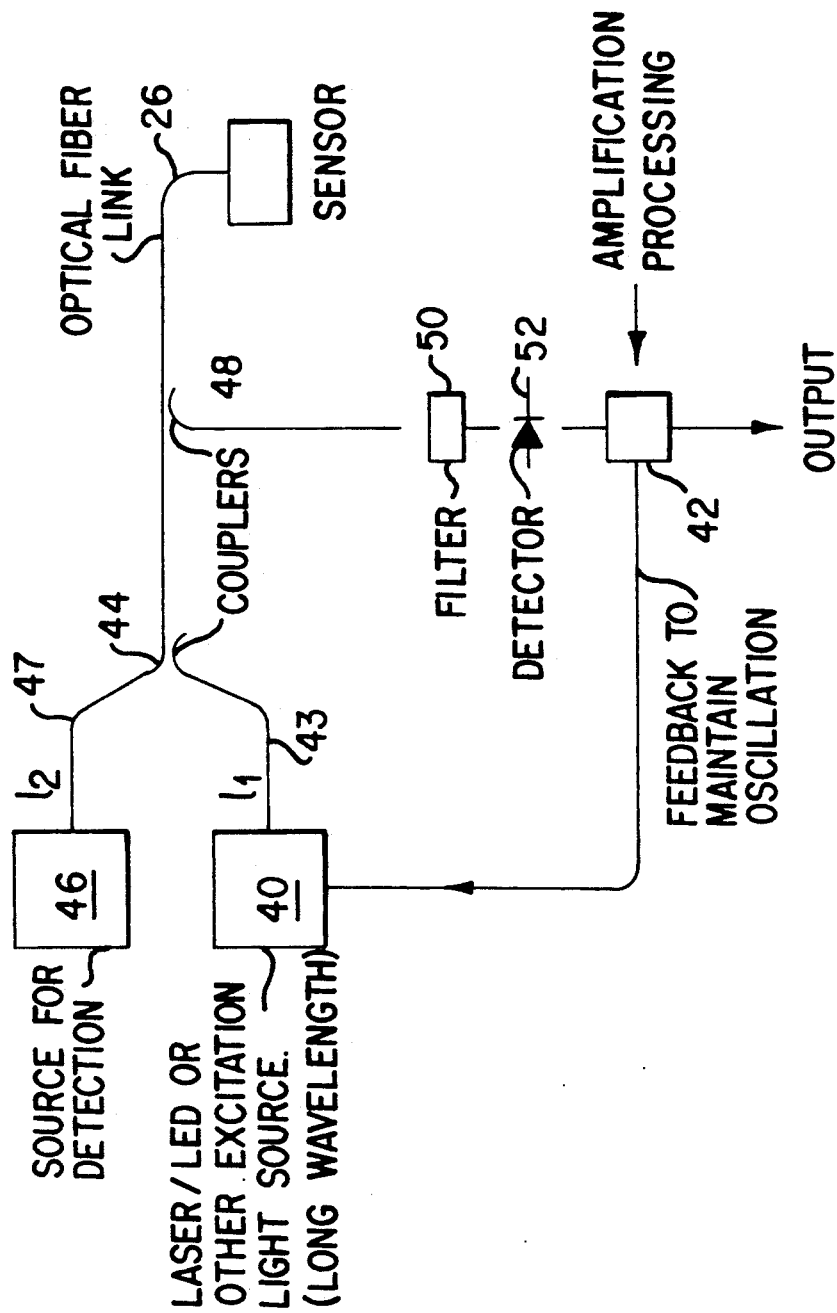
FIG. 3 is a schematic diagram of a complete sensor system based upon the sensor of FIG. 1.

The way in which the sensor 10 is incorporated into a sensor system for sensing pressure is illustrated in FIG. 3. Thus an excitation light source 40, typically a laser diode or an LED which produces an optical output at a first wavelength $l_1$ of about 1300 nm, is driven by an amplifier 42 to produce a pulsed optical excitation signal at a frequency approximately equal to the expected resonant frequency of the beam 16 in the sensor 10. The output of the source 40 is coupled via an optical fibre 43 and one input port of an optical coupler 44 into the optical fibre 26, along with a continuous optical signal, of lower wavelength $l_2$, which is produced by a source 46, typically also a laser diode or an LED, and applied via an optical fibre 47, to another input port of the coupler 44.

The pulsed optical output signal of wavelength $l_1$ exits the end of the optical fibre 26, and is incident upon and absorbed by the coating 28, thus creating localised thermal stress which excites the diaphragm 18 into vibration and thereby indirectly exciting the beam 16 into resonant vibration.

The optical signal of wavelength $l_2$ is modulated by the resonantly vibrating beam 16 in the sensor 10, and reflected back along the optical fibre 26 to a splitter 48, and thence through a Fabry-Perot or like filter 50 to a photoelectric detector 52. The output of the detector 52, which contains a component at the resonant frequency of the beam 16, is applied to the input of the amplifier 42 to create a positive feedback loop, which adjusts the operating frequency of the source 40 so as to maintain the beam vibrating at its resonant frequency, while a secondary output from the amplifier 42, again containing a component at the resonant frequency of the beam 16, constitutes the pressure dependent output of the system.

Several modifications can be made to the described embodiments of the invention.

For example, suitable optically absorbent coatings other than metal or a piezoelectric material can be used to absorb the optical excitation signal: indeed, in the limit, the coating may be omitted altogether, particularly if an especially sensitive part of the structure 24 (other than the beam 16) is located and/or slightly more optical power is used.

Also, the beam 16 can be indirectly excited into resonant vibration by excitation signals other than an optical excitation signal. Thus the optical excitation signal is believed to work by creating vibration-inducing stresses resulting from local heating due to absorption of the light constituting the optical signal (which stresses are enhanced or supplanted by stresses due to piezoelectric effect when the absorptive coating 28 exhibits surface piezoelectric effect). Similar local heating and/or piezoelectric effects can be created by forming a resistor or piezoelectric resistor in the wafer 12 or the wafer 14 at a location corresponding to a respective one of the locations A, B, D specified for the coating 28. This resistor can be formed as described in the aforementioned United States patent application of Barth et al, and would enable resonant vibration of the beam 16 to be excited by an electrical excitation signal, rather than an optical one.

We claim:

1. A sensor system for sensing a measurand, the system comprising:
    a sensor comprising a resonantly vibratable element formed as part of a unitary semiconductor structure which is arranged such that application of the measurand to the structure affects the resonant frequency of the vibratable element;
    means for exciting said element into resonant vibration; and
    means for detecting the frequency of said vibration;
    wherein said element is arranged to define with an adjacent portion of said structure a Fabry-Perot cavity whose width varies with the vibration of said element; and
    said frequency detecting means comprises means for directing an optical detection signal at said cavity for modulation thereby at the frequency of said vibration.

2. A sensor system as claimed in claim 1, wherein said optical detection signal directing means comprises a light emitting diode for producing said optical detection signal, and an optical fibre arranged to direct said optical detection signal at said cavity and to receive said optical detection signal after modulation and reflection by said cavity.

3. A sensor system as claimed in claim 2, wherein the exciting means comprises means for directing an optical excitation signal at said sensor via said optical fibre.

4. A sensor system as claimed in claim 1, wherein said portion of said structure is provided with a coating for reflecting said optical detection signal.

5. A sensor system as claimed in claim 4, wherein said coating is of a material selected from aluminium, chromium and gold.

6. A sensor system as claimed in claim 1, wherein said semiconductor structure is made from single crystal silicon.

7. A sensor system as claimed in claim 1, wherein the semiconductor structure includes a diaphragm, and said element comprises a beam arranged to have the tension therein varied by flexing of the diaphragm in response to changes in pressure applied to the diaphragm, whereby the sensor serves as a pressure sensor.

8. A sensor system as claimed in claim 7, wherein said cavity is defined between the beam and the diaphragm.

9. A sensor system as claimed in claim 1, wherein the exciting means comprises means for directing an optical excitation signal at said sensor.

* * * * *